(12) United States Patent
Rogness et al.

(10) Patent No.: US 6,263,774 B1
(45) Date of Patent: Jul. 24, 2001

(54) APPARATUS AND METHOD FOR CUTTING TWINE WOUND ABOUT A BALE

(76) Inventors: Jerome S. Rogness, 1414 Sixth St. West; Kevin G. Overland, 816 11$^{th}$ St. West, both of Williston, ND (US) 58801; Jeffrey D. Holte, 4821 37$^{th}$ Ave. Southeast, Minot, ND (US) 58701

( * ) Notice: Subject to any disclaimer, the term of this patent is extended or adjusted under 35 U.S.C. 154(b) by 0 days.

(21) Appl. No.: 09/226,476

(22) Filed: Jan. 7, 1999

(51) Int. Cl.$^7$ .............................. B26D 5/08; A01D 90/00
(52) U.S. Cl. ..................... 83/578; 83/382; 83/522.24; 83/909; 83/928
(58) Field of Search ................... 83/382, 928, 578, 83/522.11, 522.15, 522.24, 522.25, 563, 564, 701, 629, 909; 414/24.5, 24.6, 789.7; 100/89, 94, 97, 98 R, 98 A, 95, 96; 30/379, 379.5

(56) References Cited

U.S. PATENT DOCUMENTS

| | | | |
|---|---|---|---|
| 3,146,654 | * 9/1964 | Mathews et al. | 83/368 |
| 3,641,854 | * 2/1972 | Keesling | 83/578 X |
| 3,695,316 | * 10/1972 | Pluckhahn | 83/522.25 X |
| 4,163,524 | * 8/1979 | Lundahl et al. | 83/928 X |
| 4,250,783 | * 2/1981 | Ogle | 83/928 X |
| 4,370,796 | * 2/1983 | Wilson | 29/564.3 |
| 4,411,573 | * 10/1983 | Townsend | 414/24.6 |
| 4,627,340 | * 12/1986 | Glass et al. | 100/89 X |
| 4,771,670 | * 9/1988 | Woerman | 30/379 X |
| 4,783,892 | * 11/1988 | Hergeth | 29/426.4 |
| 4,835,836 | * 6/1989 | van Uitert | 29/564.3 |
| 4,890,801 | * 1/1990 | Brouwer et al. | 414/24.6 X |
| 5,072,667 | * 12/1991 | Yeardley | 100/89 X |
| 5,094,581 | * 3/1992 | Lamb | 414/24.5 |
| 5,152,123 | * 10/1992 | Viaud et al. | 83/928 X |
| 5,161,448 | * 11/1992 | Wangsness | 83/928 X |
| 5,168,786 | * 12/1992 | Huggins et al. | 83/578 X |

* cited by examiner

Primary Examiner—Charles Goodman
(74) Attorney, Agent, or Firm—Dorsey & Whitney LLP (57) ABSTRACT

An apparatus and method for severing twine from a bale supported by one or more grapple arms and bucket of a tractor is disclosed. The apparatus comprises a slide bar mounted to at least one grapple arm, the tines, or the bucket. The slide bar has a first end and a second end, and a blade riding on the slide bar, the blade oriented on the slide bar so that the blade contacts portion of the twine as the blade moves along the slide bar. A motor coupled to the blade for controllably moves the blade along the slide bar. The motor can be a reversible dc motor controllable by a switch, or a hydraulic motor. The twine about the bale can be cut without the need for the farmer to leave the driver's compartment of the tractor.

13 Claims, 11 Drawing Sheets

APPARATUS AND METHOD FOR CUTTING TWINE WOUND ABOUT A BALE

BACKGROUND OF THE INVENTION

1. Field of the Invention

This invention relates in general to farming equipment and tractors. More particularly, this invention relates to an apparatus and method for severing twine from a bale.

2. Background

In modern farming, bales of hay or other straw-like material or herbage are used for feeding animals or for other general purposes on the farm. The bales often weigh in excess of 1,000 pounds, and are typically arranged in a spiral and wrapped with twine about the periphery of bale so that the bale can be transported using a tractor having a loader. Conventional tractor loaders have a bucket and a grapple, where the grapple has tines or forks for spearing the bale.

As the bale is moved from place to place using the loader of the tractor, the bale is placed in a location on the farm where it will be unraveled and distributed for use or consumption. Conventionally, a farmer or other user manually cuts or manually severs the twine about the bale so that the bale can be distributed or consumed. This manual cutting operation generally requires that the farmer or user leaves the seat of the tractor in order to cut the twine, which can be inconvenient to the farmer.

Tractors are often equipped with protective cabins in which the farmer or user sits protected from the bad weather conditions, such as cold, rain, or excessive heat. In such situations, cutting or severing the twine from about the bale can be even more inconvenient.

It is with these shortcomings of the existing art in mind that the present invention was developed. What is needed is a method and apparatus for cutting the twine about a bale so that the cutting operation can be controlled and performed from the operator's seat within the tractor.

SUMMARY OF THE INVENTION

In light of the above, therefore, according to a broad aspect of the invention, an apparatus for severing twine from a bale supported by one or more grapple arms of a tractor is disclosed. The apparatus comprises a slide bar mounted to at least one grapple arm, the slide bar having a first end and a second end, a blade riding on the slide bar, the blade oriented on the slide bar so that the blade contacts portion of the twine as the blade moves along the slide bar, and a motor coupled to the blade for controllably moving the blade along the slide bar. The motor can be a reversible dc motor controllable by a switch, or a hydraulic motor.

The slide bar can have a generally U-shaped cross-section with a top portion and a bottom portion, with a channel formed along the top portion. The assembly can further include a slide block connected to the blade, the slide block adapted to slide within the channel along the slide bar while supporting the blade. A visual indicator indicating the position of the blade relative to the slide bar can be used in conjunction with the blade and slide block.

In one example, the assembly can include a first and second sprocket, the first sprocket coupled to the slide bar about the first end, and the second sprocket coupled to the slide bar about the second end, the first sprocket coupled to the motor for rotating the first sprocket about a fixed axis, and a chain connecting the first sprocket to the second sprocket, the blade coupled to the chain for movement of the blade along the slide bar. The slide bar can have a slot for receiving a bolt, and the second sprocket is mounted to the slide bar through the bolt, and the sprocket rotates about the bolt. A substantially U-shaped tensioning bracket can be mounted about the second end of the slide bar, the bracket having first and second opposing legs coupled to a base portion, each leg having axially aligned opening for receiving the bolt, the base having an opening for receiving a tensioning bolt for adjusting the tension of the chain about the sprockets.

In this manner and using this twine cutting assembly, the bale can be cut while supported by the loader and while the farmer is inside the driver's compartment of the tractor.

Also disclosed herein is a tractor having a driver's compartment having a set of controls for controlling the operation of the tractor, a loader having at least a pair of grapple arms coupled to grapple tines for piercing a bale having twine thereabout, and a twine cutting assembly. The twine cutting assembly includes a slide bar mounted to at least one grapple arm, the slide bar having a first end and a second end, a blade riding on the slide bar, the blade oriented on the slide bar so that the blade contacts portion of the twine as the blade moves along the slide bar, and a motor coupled to the blade for controllably moving the blade along the slide bar. A control is located within the driver's compartment for controlling the operation of the motor.

In accordance with the present invention, the twine cutting assembly can be mounted to either the grapple arms, the tines, or the bucket of the tractor.

A method of cutting a portion of twine wrapped about a bale is also disclosed herein, the method comprising the steps of positioning a grapple of a tractor about a portion of the bale, providing a twine cutting assembly on the grapple, the twine cutting assembly having a blade linearly movable in a direction generally transverse to the direction in which the twine is wrapped about the bale, and in response to a control signal, controllably moving the blade across the twine to cut the twine. The method also includes the step of providing a control within the tractor for generating the control signal.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

A twine cutting assembly suitable for use on tractor or other farming implement is disclosed herein. The twine cutting assembly includes a slide bar, a blade, and a drive device such as a motor. The blade is coupled to the motor for controllably moving the blade as guided by the slide bar so that the blade passes through and cuts the twine. As will be described in greater detail below, the twine cutting assembly of the present invention can be positioned on various locations of the tractor and can be provided with controls located with the tractor controls so that a farmer or user can cut the twine of a bale from without having to leave the seat of the tractor.

Figure 1:
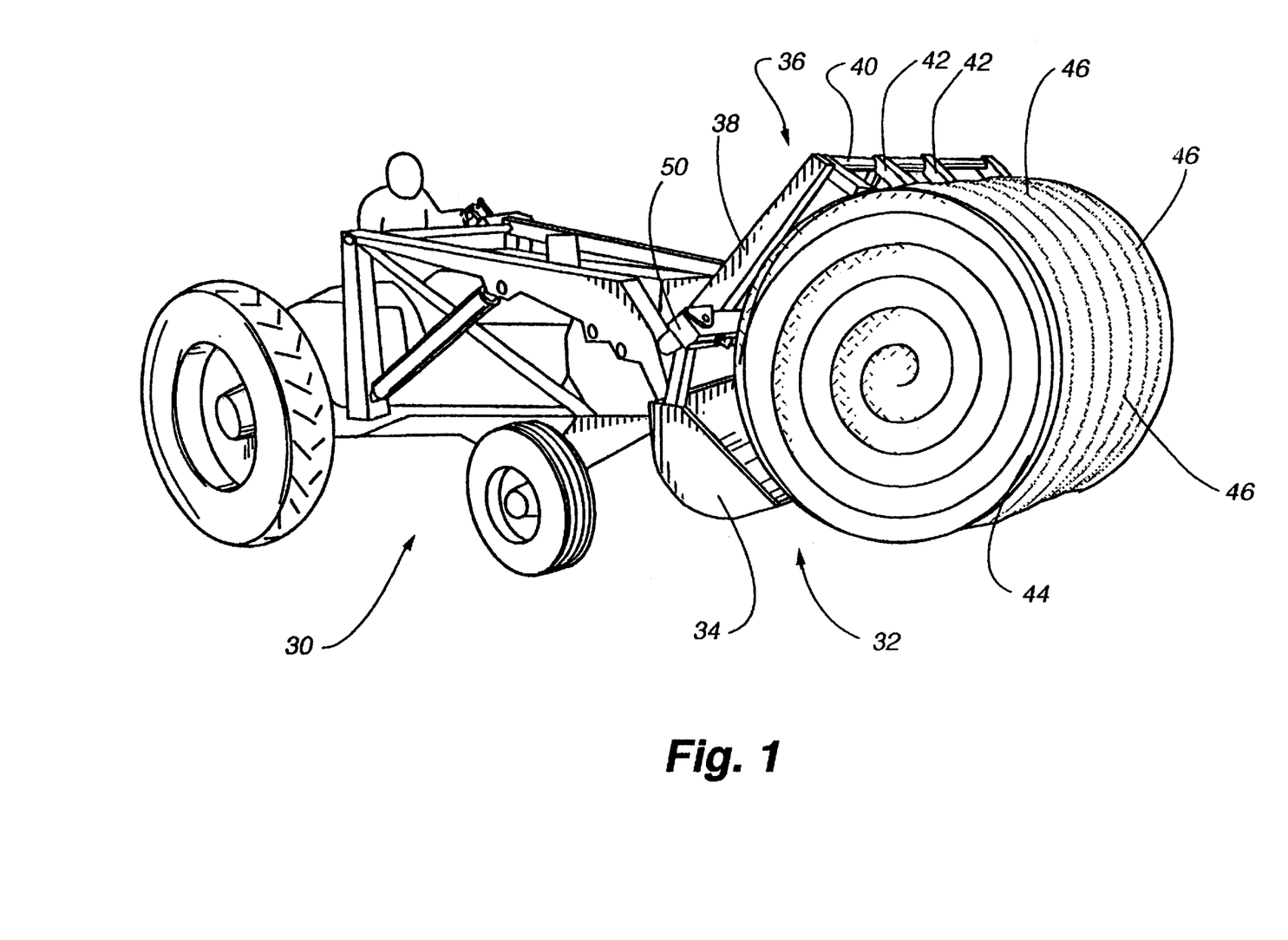
FIG. 1 illustrates a tractor having a grapple and a bucket of a loader supporting a feed bale with twine secured thereabout, with an embodiment of the present invention positioned about the grapple arms.
Figure 2:
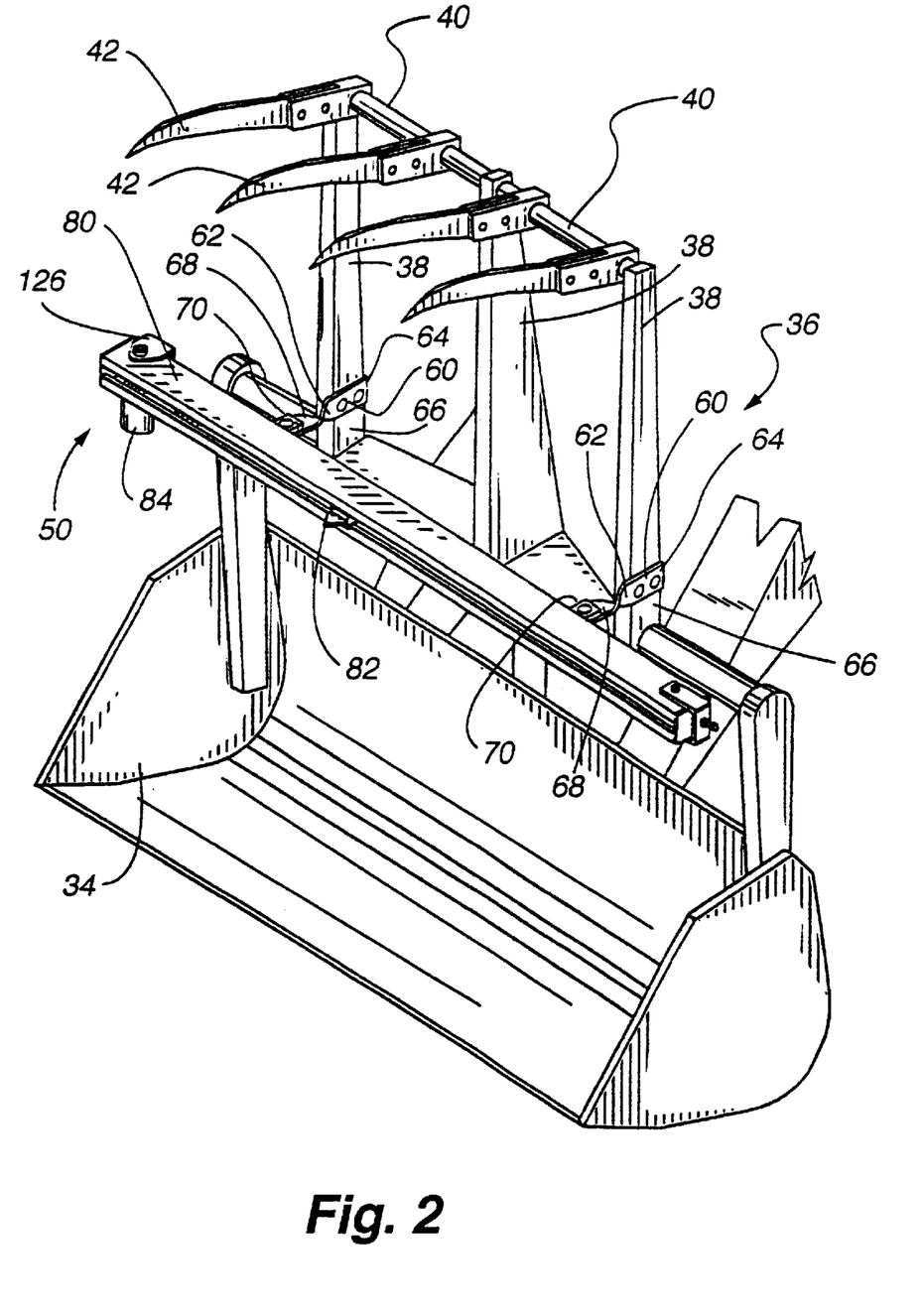
FIG. 2 illustrates an embodiment of the twine cutting assembly of the present invention mounted to a pair of grapple arms which are coupled to a bucket.

Referring now to FIG. 1, a tractor 30 having a loader 32 is shown where the loader includes a bucket 34 and a grapple 36, where the grapple has grapple arms 38, a grapple tine support tube 40, and a plurality of tines 42 for securing a bale 44 with twine 46 wrapped thereabout. As shown in FIGS. 1 and 2, the twine cutting assembly 50 of one embodiment of the present invention is positioned along the grapple in one example. It is understood that the precise position and placement of the twine cutting assembly is a matter of choice which depends on the particular structures and geometries of the tractor attachments, such as the bucket 34 or grapple 36. For instance, the twine cutting assembly could be mounted along various positions of the grapple 36, grapple arms 38, grapple tines 42, or within the bucket 34 at various locations.

Referring to FIG. 2, the twine cutting assembly 50 is shown coupled to a pair of the grapple arms 38 between the bucket 34 of the loader and the tines 42 of the grapple arms. A pair of mounting brackets 60 are shown wherein the mounting brackets are generally each rectangular in shape and have a twist 62 along their length so that one end 64 of the mounting bracket can be coupled to a vertical surface 66 of the grapple arm 38 in a vertical orientation, while the other end 68 of the mounting bracket can be coupled to and support the twine cutting assembly along a horizontal surface 70 in a horizontal orientation. The shape, number, and position of the brackets can be varied depending on the particular geometries of the surfaces to which the twine cutting assembly 50 is attached.

Referring to FIG. 2 and as discussed above, the twine cutting assembly includes a slide bar 80, a blade 82, and a drive device 84 such as a motor. The blade 82 is mechanically coupled to the motor for controllably moving the blade as guided by the slide bar 80 so that the blade passes through and cuts the twine.

The slide bar 80 has a generally elongated and rectangular shape, and in one example is mounted to the grapple arms 38 such that the blade 82 is oriented to contact the twine as the blade 82 moves along the slide bar 80 to cut the twine on the bale. Referring to FIGS. 2, 3, 4, 5, 6, 7, the slide bar 80 is generally U-shaped in cross-section with a top portion 86 and bottom portion 88, and a channel 90 formed along the top portion therein, in one embodiment of the invention. In one example, the slide bar 80 is approximately seven feet long and three inches in width, with the channel 90 being approximately one inch in width, with the height of the slide bar being approximately four inches. These dimensions are by way of example only, as the slide bar 80 can be sized and shaped according to the dimensions of the particular application.

Figure 5:
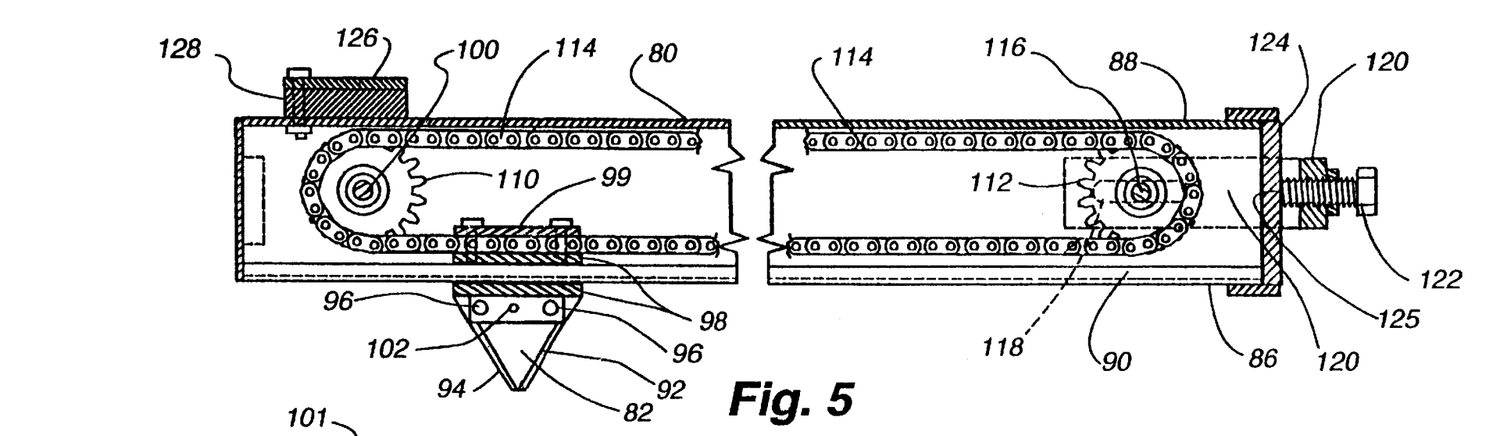
FIG. 5 is a sectional view taken along section lines 5—5 of FIG. 3 showing a sprocket and chain coupled to the blade through a slide block riding along the slide bar, in accordance with one embodiment of the present invention.
Figure 17:
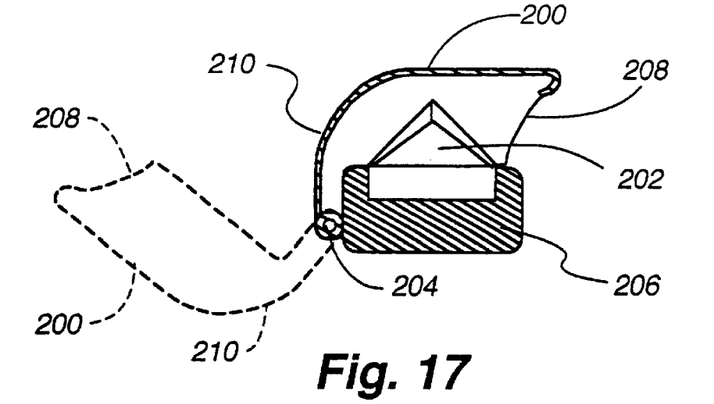
FIG. 17 illustrates a blade cover positioned over a blade and rotatable about a point for covering the blade when the blade is not in use, in accordance with one embodiment of the present invention.
Figure 18:
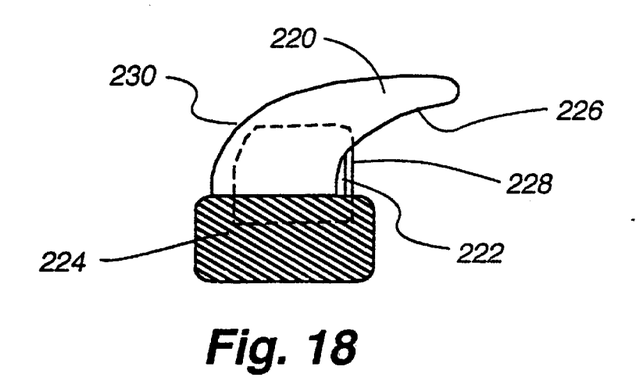
FIG. 18 illustrate a blade cover positioned over a blade for covering a portion of the blade, in accordance with one embodiment of the present invention.

Referring to FIG. 5, the blade or sickle 82 is shown having a first edge 92 and a second edge 94 for cutting the twine. The two edges 92, 94 are provided so that the twine can be cut while the blade is traveling in either direction along the slide bar 80. The blade 82 is provided with a pair of openings 96 for securement to the slide block 98, described below. It is understood that while the blade 82 shown is a two-edged, V-shaped blade, other blade designs could be utilized which would provide the same benefits. For instance, a blade with a single edge could be used. Additionally, a blade cover can be provided for covering the blade while the blade is not in use. Examples of blade covers are shown in FIGS. 17 and 18, and will be described below.

Figure 4:
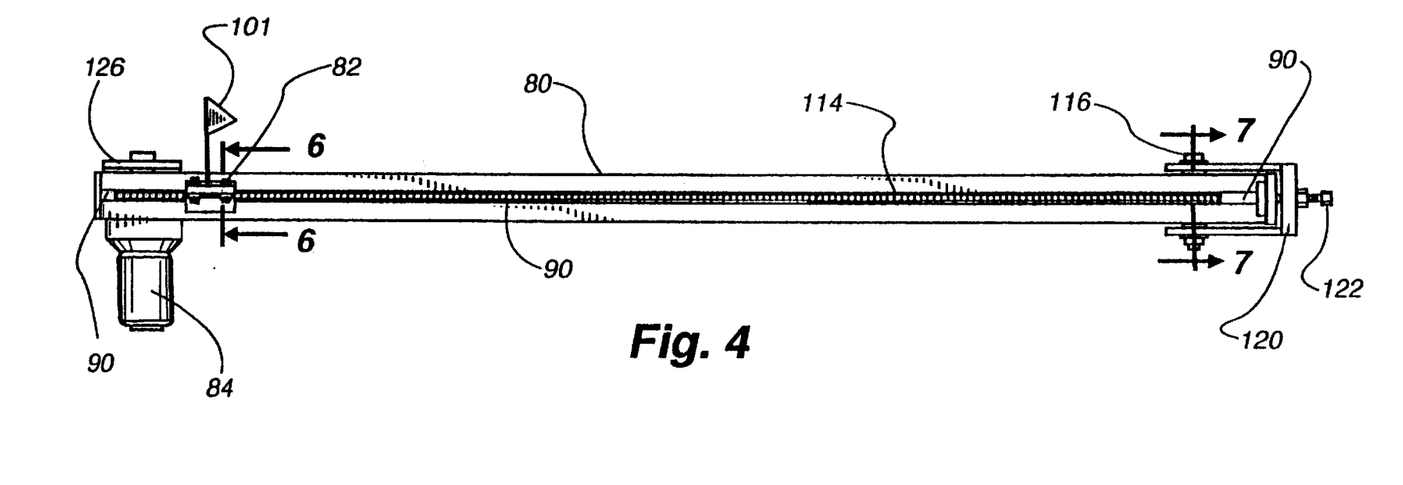
FIG. 4 illustrates a top view of one embodiment of the present invention, wherein the slide bar, the blade, and the motor can be seen.
Figure 6:
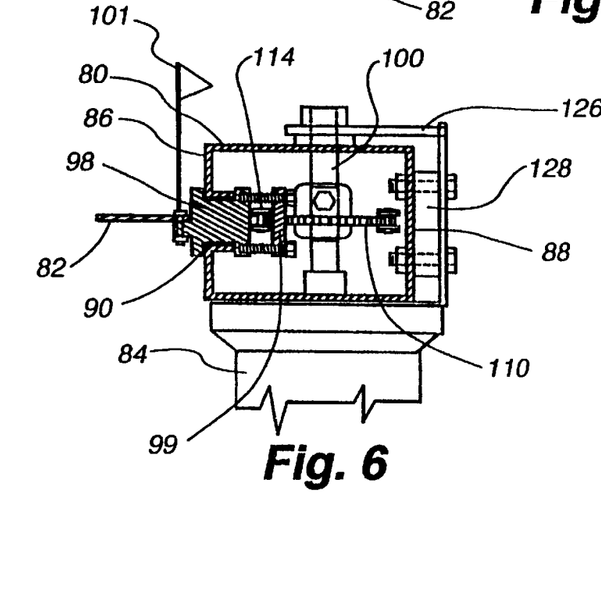
FIG. 6 is a sectional view taken along section lines 6—6 of FIG. 4 illustrating a cross section of the slide bar, the blade, and the slide block, in accordance of one embodiment of the present invention.
Figure 7:
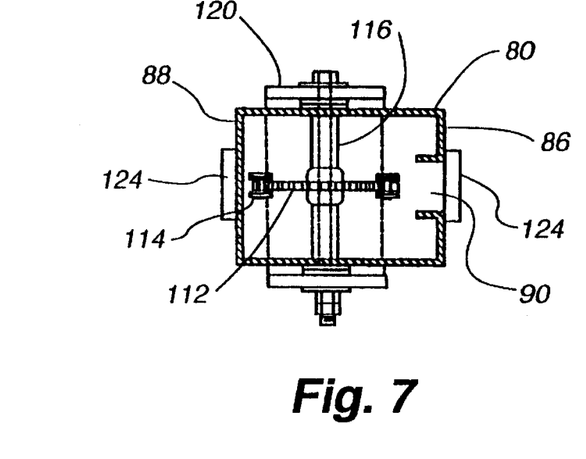
FIG. 7 illustrates a sectional view taken along section lines 7—7 of FIG. 4 illustrating the slide bar and sprocket.

The motor 84 shown in FIGS. 4 and 6 is preferably a DC motor capable of operating with conventional 12–14 volt DC supply voltage, as provided by the battery on a tractor. As seen in FIGS. 5–6, the motor has a shaft 100 which is mechanically coupled to the blade 82 for moving the blade along the slide bar 80.

Preferably, the motor 84 is rated for low speed, high torque operation in order to generate sufficient force to drive the blade 82 through the bale and cut the twine, as the twine can be under high tension due to the weight of the bale. Further, the motor 84 is preferably reversible in direction. A 12-volt DC motor, winch model 6x190-9, available from Grainger, Inc. of Fargo, N. Dak., has been found to be suitable. A hydraulic motor or "orbit" motor could also be used, where a low speed, high torque motor usable on farm equipment would also be desirable. A hydraulic motor is particularly appropriate where the tractor is provided with hydraulic supply lines for accessories, and being controllable from the driver's compartment of the tractor, such as with modern tractors. Examples of such motors include the Char-Lynn H, S, and 2000 series hydraulic motors available from Bailey Sales Corporation of Knoxville, Tenn. For retrofitting an older tractor, the 12 volt system operates with tractors having electric power available throughout the tractor. Additionally, it is understood that the present invention could operate with tractors having different battery supply voltages.

Preferably, the blade 82 moves at a rate of approximately six (6) inches per second across the slide bar 80. In this manner, the blade is not moving at an excessively fast rate which may be more dangerous. However, it is understood that the rate at which the blade travels is a matter of choice dependant on the particular implementation.

As seen in FIGS. 6 and 5, the slide block 98 is adapted to slide or move within the channel 90 along the slide bar 80, where the slide block 98 is coupled to the blade 82 through the pair of openings 96. The slide block 98 maintains the blade 82 within the channel 90 of the slide bar, which reduces the chance that the blade will dislodge from the twine cutting assembly if the motor 84 becomes disconnected from the blade. The slide block has a mounting plate 99 for attachment of the slide block to a chain or cable, described below. A flexible flag or other visual indicator 101 can be coupled to the blade or the slide block 98 as shown in FIG. 6 through an aperture 102 (FIG. 5) so to assist the farmer or user to visually determine the position of the blade along the slide bar.

The blade 82 can be coupled to the drive device or motor 84 in a number of ways, so that the motor controllably moves the blade 82 along the slide bar 80. In one example, referring to FIG. 5, a pair of sprockets 110, 112 are rotatably mounted about each end of the slide bar, and a chain or belt 114 is positioned about the sprockets 110, 112 and coupled to the slide block 98 using mountain plate 99. The chain 114 is preferably a 14-foot chain of number 40 type. One sprocket 110 is coupled to the shaft 100 of the motor 84 which controllably rotates the sprocket 110 about its mounting. The opposing sprocket 112 is mounted within the slide bar 80 through a sprocket support bolt 116 being movable within a slot 118 so as to permit tensioning of the chain through the position of the bolt 116 and the sprocket 112.

Figure 3:
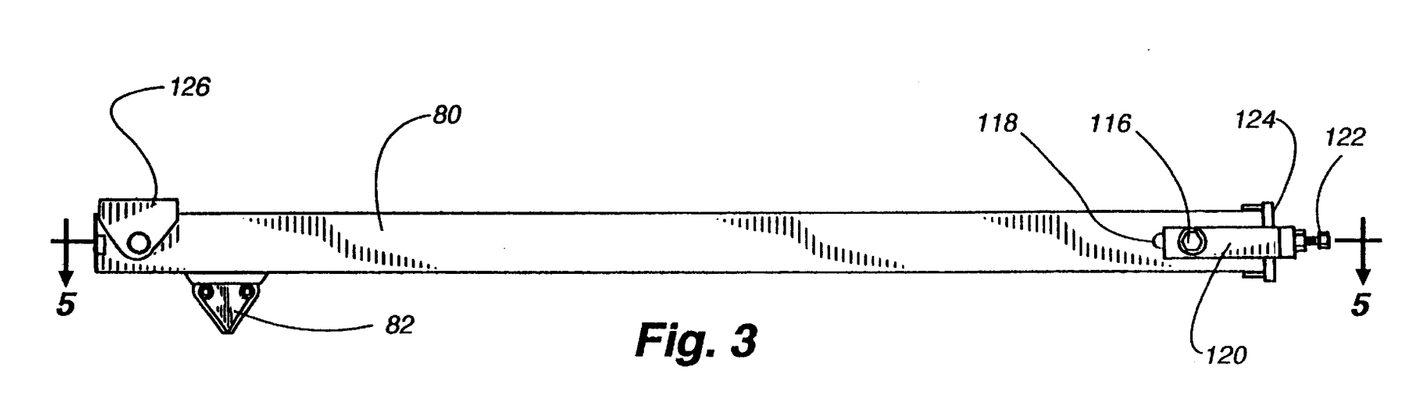
FIG. 3 illustrates a plan view of one embodiment of the twine cutting assembly of the present invention, showing the slide bar and the blade.

A tensioning bracket 120 is provided with a tensioning bolt 122, as shown in FIGS. 3, 4, and 5. The tensioning bracket 120 is U-shaped and positions the sprocket support bolt 116 within the slot 118. As the tensioning bolt 122 is tightened, the tensioning bracket 120 moves away from the end of the slide bar 80 so as to increase the tension of the chain 114 until a desirable tension is obtained. An end cap 124 can also be provided so to protect the components internal to the slide bar 80, and also provides a bearing surface 125 against which the tensioning bolt 122 contacts.

As shown in FIGS. 2, 3, and 6, a bracket 126 is used to affix the motor 84 to the slide bar 80 and maintain shaft 100 of the motor in a fixed position relative to the slide bar 80 and the sprocket 110. Spacer blocks 128 can also be used along the motor's mounting bracket 126 so that the shaft 100 of the motor is properly positioned.

Figure 13A:
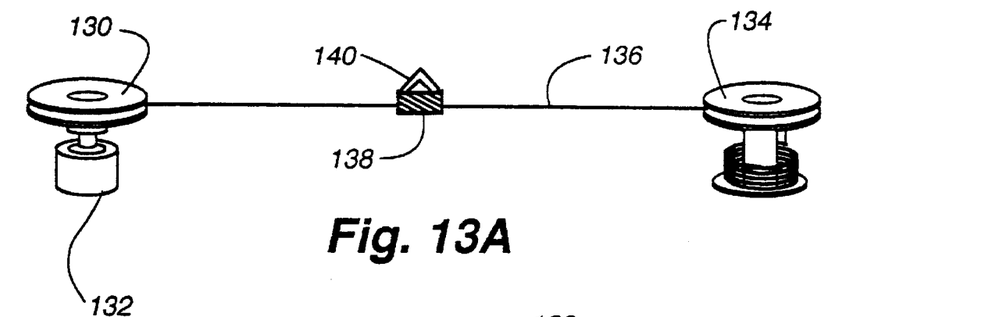
FIGS. 13A and 13B illustrate alternate embodiments for the sprocket and chain drive members of the present invention.
Figure 13B:
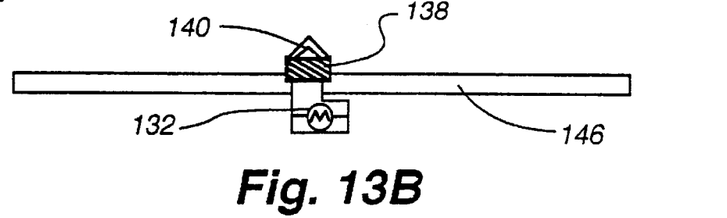

In an alternate embodiment, a cable-pulley/spool system could be utilized, or a belt-pulley system, in place of the chain and sprocket system discussed above, as shown in FIG. 13A. A first pulley or spool 130 is coupled to the motor 132 while the second pulley or spool 134 is spring loaded and coupled to the first pulley 130 through a cable or belt 136 to provide a tension along the cable. A slide block 138 connects the blade 140 to the cable and maintains the blade within the channel of the slide bar (not shown) in the event the cable should fail. In another embodiment, a motor 132 is positioned on the slide block 138 so that the blade 140, slide block 138, and motor 132 move along a track 146, as shown in FIG. 13B.

Figure 14:
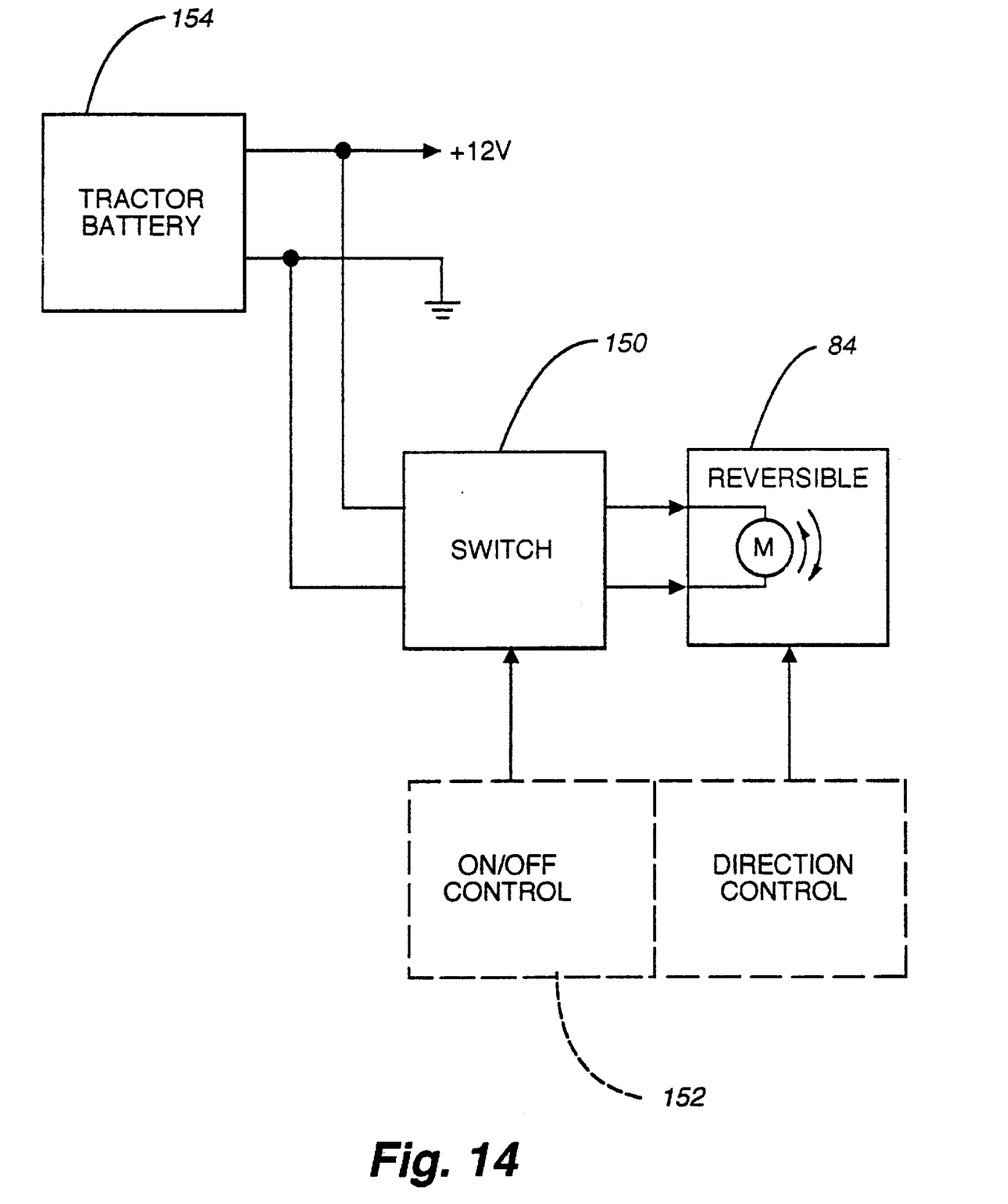
FIG. 14 illustrates a circuit block diagram for the electrical connections and controls in accordance with one embodiment of the present invention.

FIG. 14 illustrates a circuit block diagram for the electrical connections and controls in accordance with one embodiment of the present invention. The reversible motor 84 is coupled to a switch 150 having controls 152 capable of controlling the power (on/off control) and the direction (forward/backwards) of the motor coupled to the battery 154. In one embodiment, the switch 150 can be a single switching device with three positions: forward, off, and reverse. A suitable switch, for example, is model 6x192-5 available from Grainger, Inc. of Fargo, N. Dak. The control 152 can be located with the driver's compartment of the tractor so that the farmer or user can control the operation of the twine cutting assembly from within the driver's compartment.

Figure 15:
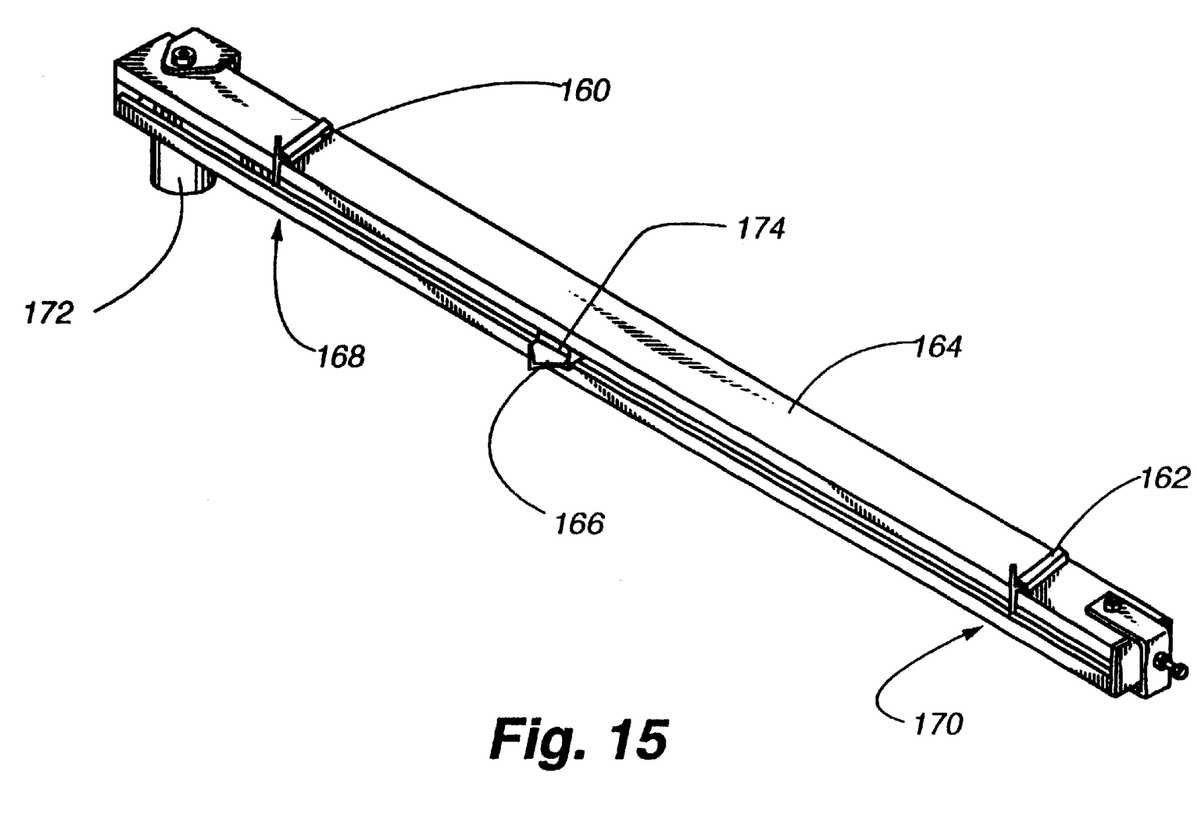
FIG. 15 illustrates two limit switches positioned on the slide bar in accordance with one embodiment of the present invention.
Figure 16:
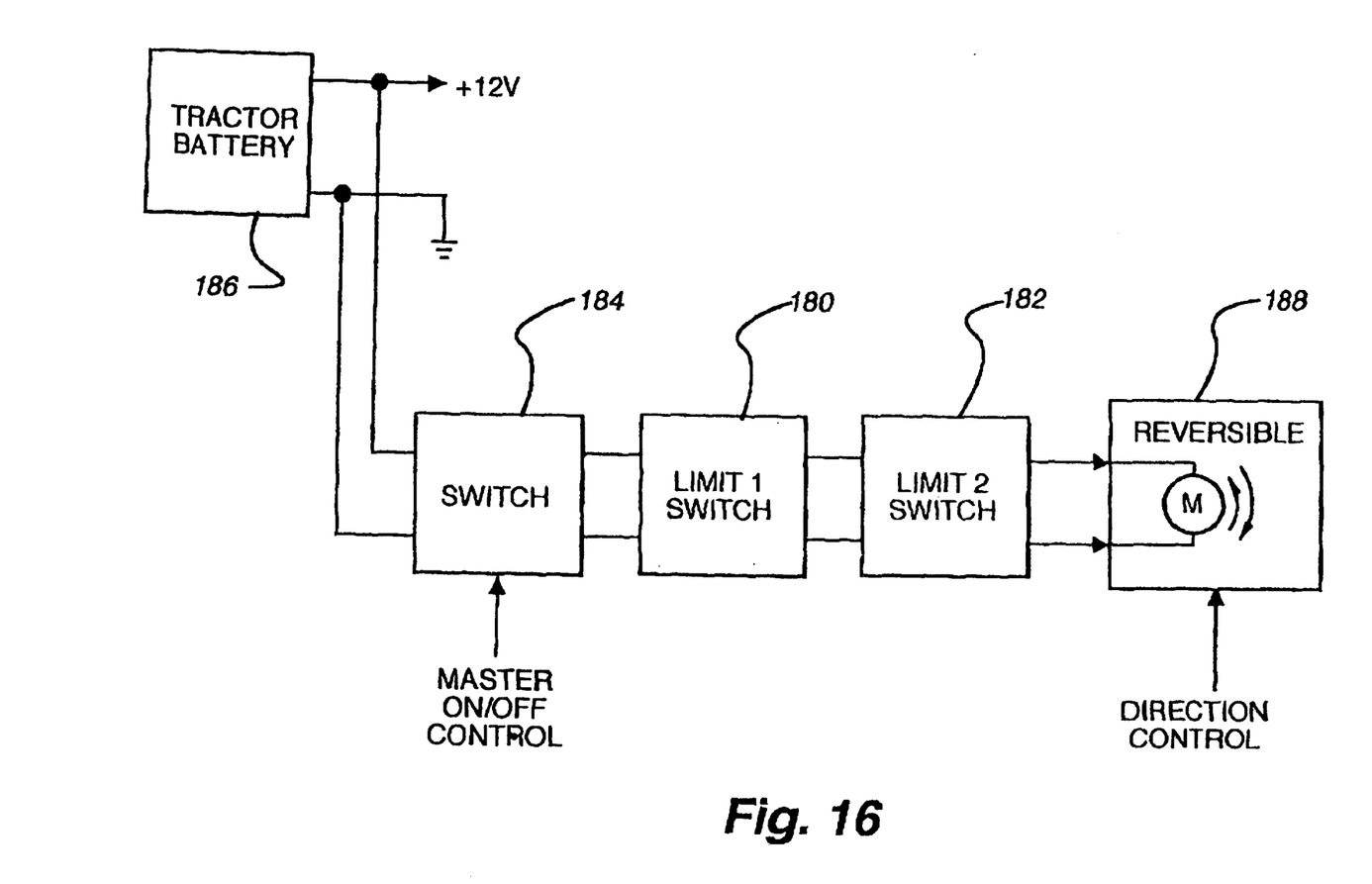
FIG. 16 illustrates a circuit block diagram for the electrical connections and controls in accordance with one embodiment of the present invention.

As shown in FIG. 15, conventional limit switches 160, 162 can be provided on both ends of the slide bar 164 so that the blade 166 will travel between a first 168 and second 170 position along the slide bar 164 and the motor 172 can be automatically reversed if desired by the farmer or user. The limit switches 160, 162 should be configured to be responsive to the position of the blade 166 or slide block 174 along the slide bar (i.e., the limit switches should trip or become an open circuit when the blade/slide block reaches the respective limit position). FIG. 16 illustrates a circuit block diagram for the electrical connections and controls, in accordance with one embodiment of the present invention, showing the limit switches 180, 182 connected in series with the master on/off control 184 so that power 186 to the motor 188 is cut-off when either limit switch is tripped by the position of the blade. It is understood that various configurations of the switches can be used and are a matter of choice as desired, for instance, the switches can be configured to reverse the direction of the motor when the blade/slide block reaches the limit position.

As mentioned above, various blade covers and designs can be used. FIG. 17 illustrates a blade cover 200 positioned over a blade 202 and rotatable about a point 204 for covering the blade when the blade is not in use, in accordance with one embodiment of the present invention. The cover 200 is affixed to the slide block 206 and has a first curved edge 208 so that as the blade/slide block moves in a first direction, the twine and other contents of the bale move the cover 200 away from the blade 202 and expose the blade so that the blade can cut the twine. When the blade/slide block moves in the opposite direction, the second curved edge 210 contacts the contents of the bale and moves the cover 200 back over the blade 202. A spring (not shown) can be employed to bias to blade cover 200 in the covering position when no external forces are applied to either edge 208, 210 of the cover. It is understood that when using the blade and cover of FIG. 17, the twine cutting assembly would only cut twine in the first direction, and a single edged blade would be suitable.

In another embodiment, FIG. 18 illustrates a blade cover 220 permanently positioned over a single edged blade 222 for covering a portion of the blade. The cover 220 can be affixed to the blade 222 and the slide block 224, and the cover has a first curved edge 226 which, when in contact with the twine as the blade/slide block move in a first direction, can move the twine towards the blade's edge 228 for cutting. The second curved edge 230 of the blade cover 220 is curved to reduce the force required to move the blade/slide block in the opposite direction. It is understood that when using the blade 222 and cover 220 of FIG. 18, the twine cutting assembly would only cut twine in the first direction.

Alternatively, a blade cover could be mounted and fixed at one end of the slide bar to cover the blade when the blade is positioned at that end, so that the blade is covered when the twine cutting assembly is not in use. The blade would be returned to the position under the cover after each use.

Figure 8:
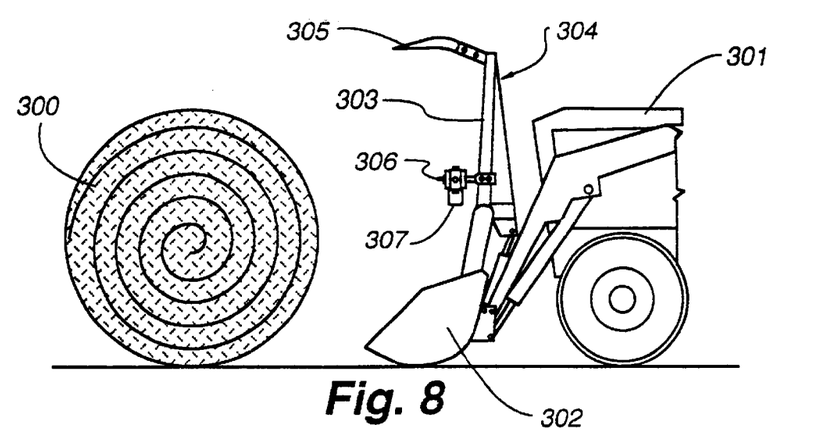
FIG. 8 illustrates a tractor having a loader having a bucket and grapple arms with tines in an open position approaching the bale with one embodiment of the present invention mounted to the grapple arms.
Figure 9:
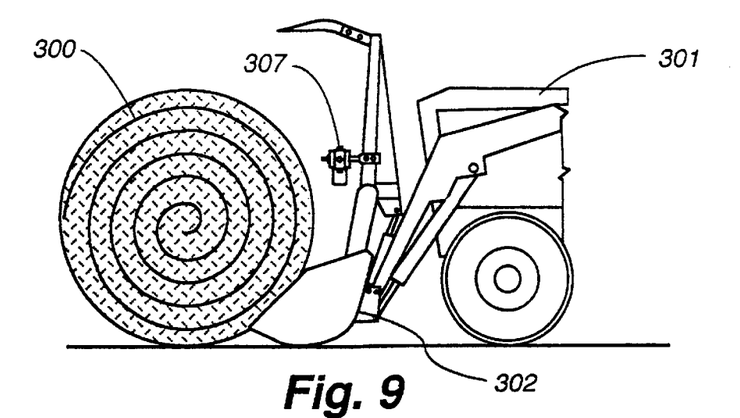
FIG. 9 is an illustration of the tractor of FIG. 8 as the bucket of the loader of the tractor contacts the bale.
Figure 10:
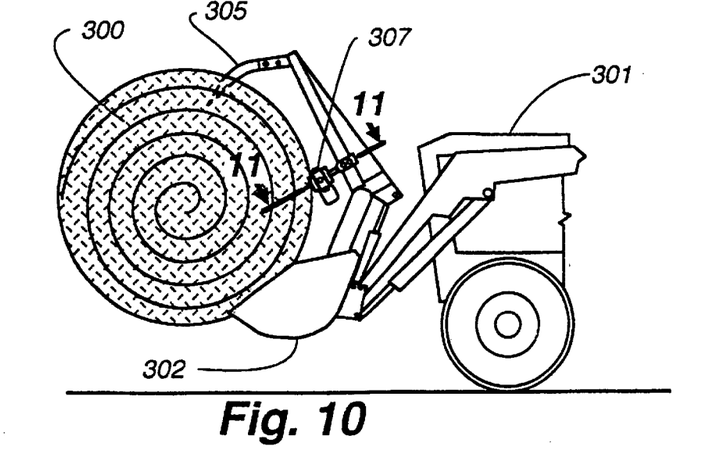
FIG. 10 illustrates the tractor of FIG. 8–9 as the bale is secured and lifted by the tractor bucket and grappler tines and the blade and slide bar are positioned along the bale, in accordance of one embodiment of the present invention.
Figure 11:
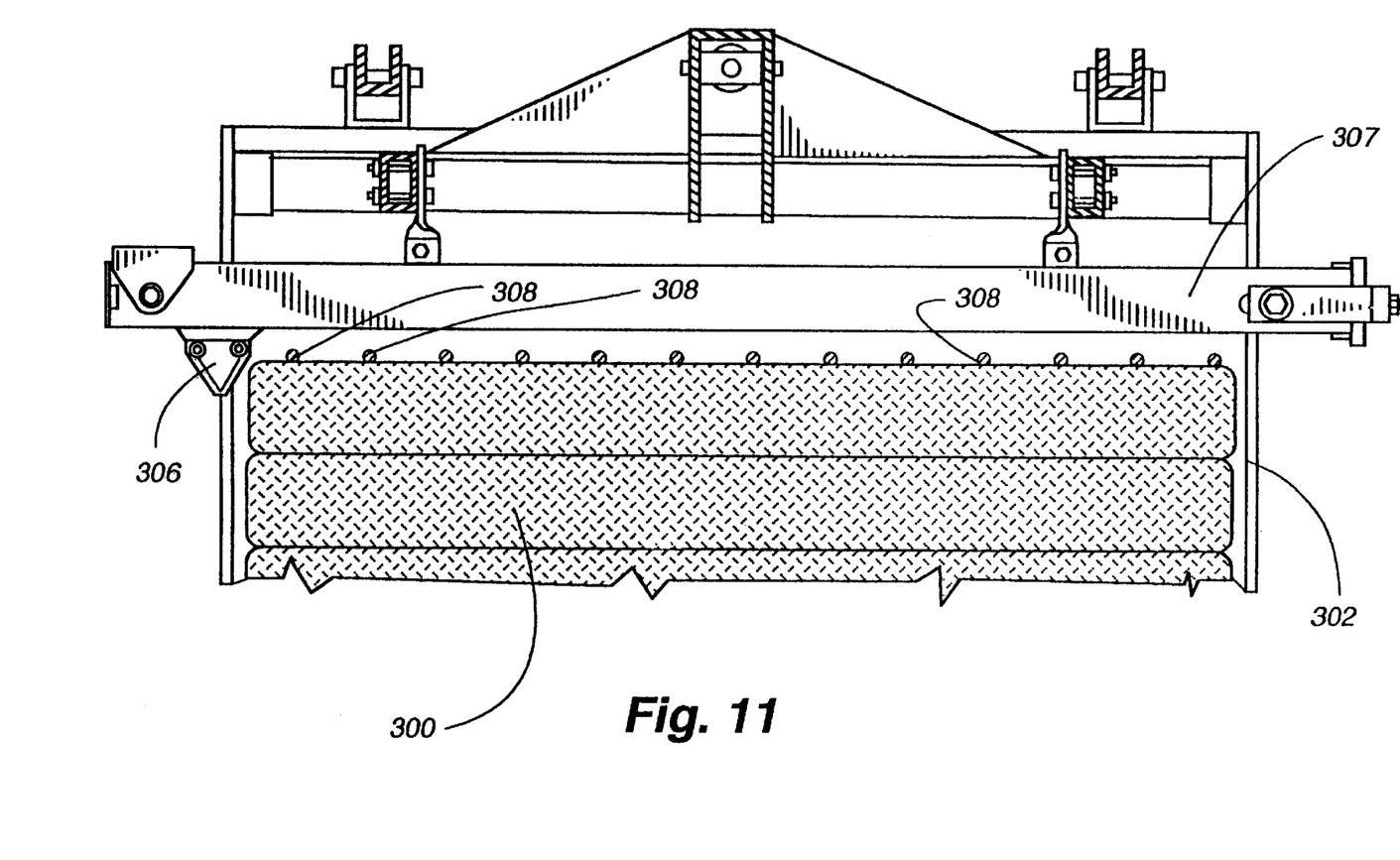
FIG. 11 is a sectional view taken along section lines 11—11 of FIG. 10, illustrating the position of the blade and the slide bar of the present invention relative to the grapple arms and the twine about the bale, in accordance of one embodiment of the present invention.
Figure 12:
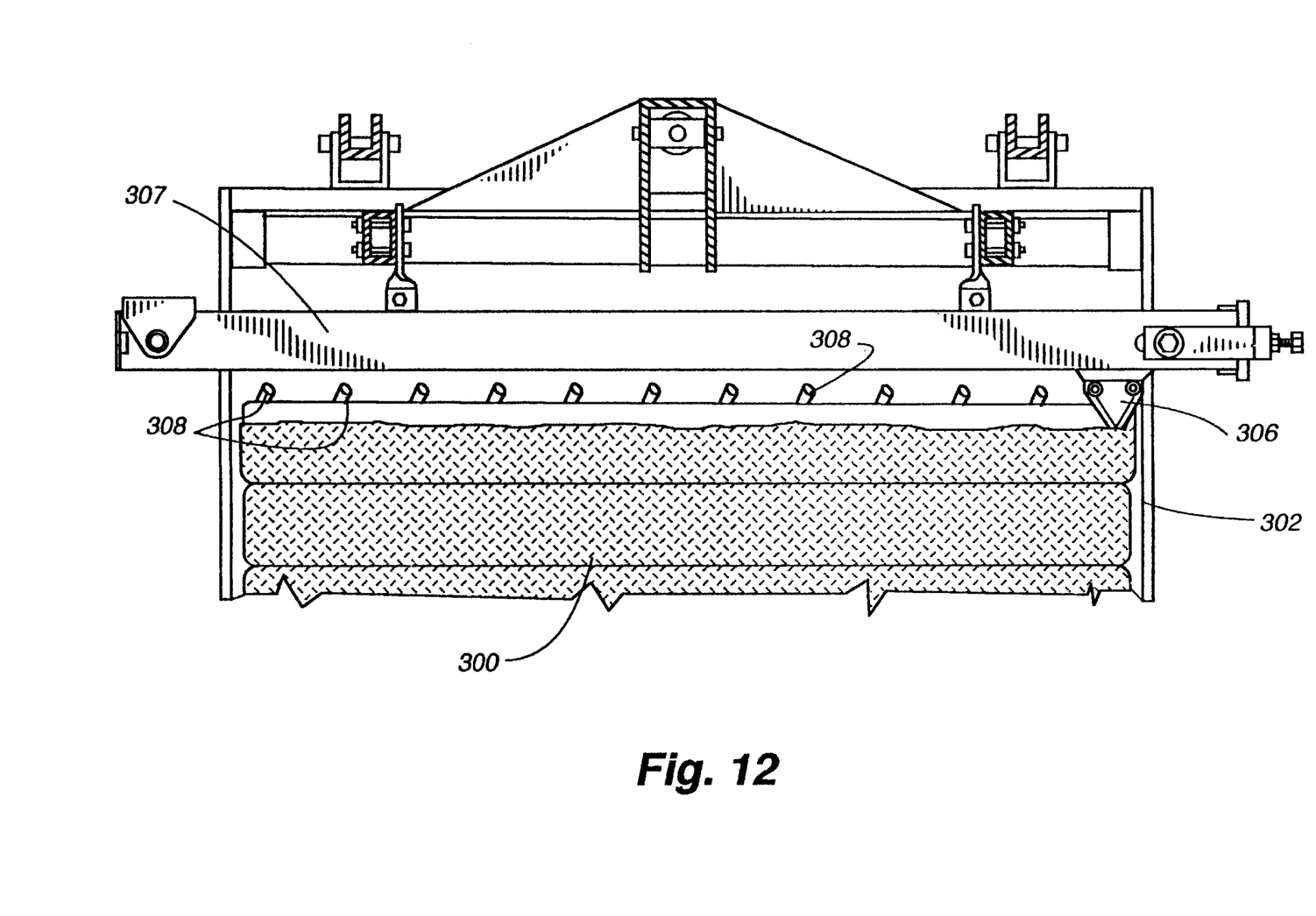
FIG. 12 illustrates the twine and the bale of FIG. 11 after the blade has cut the twine in accordance with one embodiment of the present invention.

In accordance with the invention, and as shown in FIGS. 8–10, a farmer or user can position and secure a bale 300 using the tractor's bucket 302 and grapple 304 and selectively pass the blade 306 through a portion of the bale to cut the twine 308 so that the bale can be distributed, as shown in FIGS. 11–12.

In this way, the farmer or user can perform these operations without the necessity of leaving the seat of the tractor. FIG. 8 illustrates a tractor 301 having a bucket 302 and grapple arms 303 with tines 305 in an open position approaching the bale 300 with one embodiment of the twine cutting assembly 307 mounted to the grapple arms 303 as shown. FIG. 9 shows of the tractor of FIG. 8 as the bucket of the tractor contacts the bale, while FIG. 10 shows the bale being secured and lifted by the tractor bucket and grappler tines, and the blade and slide bar are positions along the bale, in accordance of one embodiment of the present invention. The blade is then passed through the bale in order to cut the twine, as described above, using the control located within the driver's compartment of the tractor.

The twine cutting assembly can be included in an "aftermarket" assembly, either together with a loader, grappler and/or a bucket, or as a separate assembly to retrofit existing tractors. The twine cutting assembly can also be provided and integrated into a production design for a new tractor.

While the invention has been particularly shown and described with reference to a preferred embodiment thereof, it will be understood by those skilled in the art that various other changes in the form and details may be made without departing from the spirit and scope of the invention.

We claim:

1. An apparatus for severing twine from a bale supported by one or more grapple arms of a tractor having a driver's compartment for a driver, comprising:
    a slide bar mounted to at least one grapple arm, the slide bar having a first end and a second end;
    a non-rotating blade guided by the slide bar, the blade oriented with respect to the slide bar so that the blade contacts a portion of the twine as the blade moves along the slide bar;
    a DC motor coupled to the blade for controllably moving the blade along the slide bar; and
    a switch located within reach of the driver when the driver is in the driver's compartment, said switch controlling said DC motor wherein when said switch is depressed by said driver, the DC motor moves the blade from a first position proximate said first end, cutting through the twine, to a second position proximate said second end thereby cutting said twine therebetween.

2. The apparatus of claim 1, wherein:
    the slide bar has a generally U-shaped cross-section with a top portion and a bottom portion, and the slide bar has a channel longitudinally extending along the top portion.

3. The apparatus of claim 2, further comprising:
    a slide block connected to the blade, the slide block positioned within the channel along the slide bar to support the blade.

4. The apparatus of claim 1, further comprising:
    a visual indicator indicating the position of the blade relative to the slide bar.

5. The apparatus of claim 1, further comprising:
    a first and second sprocket, said first sprocket coupled to said slide bar about said first end, and said second sprocket coupled to said slide bar about said second end, said first sprocket coupled to said motor for rotating said first sprocket about a fixed axis;
    a chain connecting said first sprocket to said second sprocket, said blade coupled to said chain for movement of the blade along the slide bar.

6. The apparatus of claim 5, wherein said slide bar has a slot for receiving a bolt, and said second sprocket is mounted to said slide bar through the bolt, and the sprocket rotates about the bolt.

7. The apparatus of claim 5, further comprising:
    a substantially U-shaped tensioning bracket mounted about the second end of the slide bar, the bracket having first and second opposing legs coupled to a base portion, each leg having axially aligned opening for receiving said bolt, the base having an opening for receiving a tensioning bolt for adjusting the tension of the chain about the sprockets.

8. A tractor, comprising:
    a driver's compartment having a set of controls for controlling the operation of the tractor;
    a loader having at least a pair of grapple arms coupled to grapple tines for piercing a bale having twine thereabout;
    a twine cutting assembly, comprising:
        a slide bar mounted to at least one grapple arm, the slide bar having a first end and a second end, the slide bar having a generally U-shaped cross-section with a top portion and a bottom portion, the slide bar having a channel formed along the top portion and longitudinally extending therethrough;
        a blade guided by the slide bar, the blade oriented with respect to the slide bar so that the blade contacts a portion of the twine as the blade moves along the slide bar;
        a slide block connected to the blade, the slide block positioned within the channel along the slide bar; and
        a motor coupled to the slide block for controllably moving the blade along the slide bar.

9. The tractor of claim 8, further comprising:
    a control located within the driver's compartment for controlling the operation of the motor.

10. The tractor of claim 8, further comprising:
    a first and second sprocket, said first sprocket coupled to said slide bar about said first end, and said second sprocket coupled to said slide bar about said second end, said first sprocket coupled to said motor for rotating said first sprocket about a fixed axis;
    a chain connecting said first sprocket to said second sprocket, said blade coupled to said chain for movement of the blade along the slide bar.

11. The tractor of claim 8, further comprising:
    a visual indicator indicating the position of the blade relative to the slide bar.

12. The tractor of claim 8, wherein the motor is a reversible dc motor controllable by a switch.

13. The tractor of claim 8, wherein the motor is a hydraulic motor.

* * * * *